Oct. 27, 1925.

P. E. NORRIS

ELECTRIC BATTERY

Filed April 18, 1922

1,558,910

Paul E. Norris
INVENTOR,

BY A. R. Verrall

ATTORNEY

Patented Oct. 27, 1925.

1,558,910

UNITED STATES PATENT OFFICE.

PAUL E. NORRIS, OF WILKINSBURG, PENNSYLVANIA, ASSIGNOR TO WESTINGHOUSE UNION BATTERY COMPANY, OF SWISSVALE, PENNSYLVANIA, A CORPORATION OF PENNSYLVANIA.

ELECTRIC BATTERY.

Application filed April 18, 1922. Serial No. 554,752.

*To all whom it may concern:*

Be it known that I, PAUL E. NORRIS, a citizen of the United States, residing at Wilkinsburg, in the county of Allegheny and State of Pennsylvania, have invented certain new and useful Improvements in Electric Batteries, of which the following is a specification.

My invention relates to electric batteries, and particularly to batteries of the secondary or storage type.

I will describe one form of battery embodying my invention, and will then point out the novel features thereof in claims.

Figure 1:
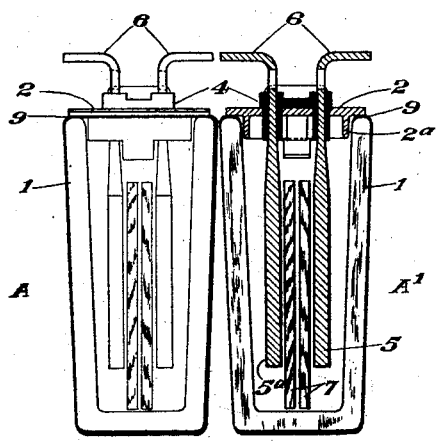
Figure 2:
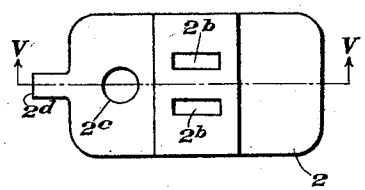
Figure 3:
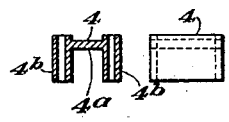
Figure 4:
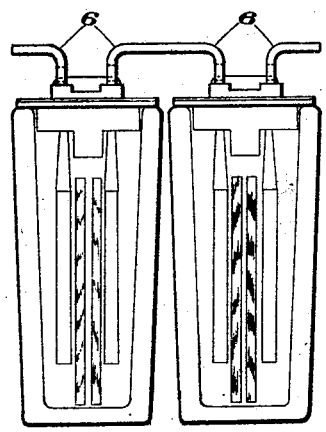
Figure 5:
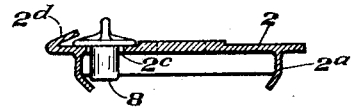

In the accompanying drawing, Fig. 1 is a view showing two cells of battery embodying my invention, one being in side elevation and the other in vertical cross section, the adjacent terminal posts being unconnected. Fig. 2 is a top view of the cover plate forming part of each cell of the battery shown in Fig. 1. Fig. 3 comprises two views showing an insulating member forming part of each cell of the battery shown in Fig. 1. Fig. 4 is a view similar to Fig. 1 but showing both cells in side elevation and the two adjacent terminal posts burned together. Fig. 5 is a sectional view of the cover 2 on the line V—V in Fig. 2, showing a plug in place in the vent hole and the retaining lug bent into position to engage the plug.

Similar reference characters refer to similar parts in each of the several views.

Referring first to Fig. 1, each cell A and A' comprises a jar 1 of insulating material such as glass, and a cell cover 2 of a metallic alloy impervious to battery acid such as antimony lead. This cell cover is provided with a skirt $2^a$ which fits inside of the jar to hold the cover in place and the cover may be attached to the jar by sealing compound which is indicated at 9.

The cell cover 2 is provided with two holes or slots $2^b$, $2^b$, as best shown in Fig. 2, and these slots are fitted with an insulating member 4 which is shown in detail in Fig. 3. The insulating member, which is preferably made of soft rubber, comprises a flat portion $4^a$ resting on the top of the cell cover 2, and two hollow legs $4^b$ which project through the two holes $2^b$, $2^b$ respectively in the cover plate and fit tightly therein.

Each cell A and A' contains a positive plate 5, a negative plate $5^a$, and one or more separators 7. Each plate is provided with a long lug 6 which projects upwardly through one of the legs of the insulating member 4 and extends well above the top of this member. Each plate lug fits tightly in the associated leg of the insulating member, and since this member fits tightly into the holes in the cover plate it follows that the structure prevents leakage of electrolyte at the places where the plate lugs project through the cell cover.

The plate lugs 6 are bent over into a horizontal plane above the cell cover to form terminal posts or terminal connectors.

Each cell is of course filled with a suitable electrolyte which is preferably in the form of a jelly.

The preferred method of assembling the parts constituting each cell of the battery is as follows: The insulating member 4 is first placed in proper position in the cell cover with the legs $4^b$ projecting through the holes $2^b$, and the plate lugs 6, which have previously been bent at right angles to the plates, are then slipped through the legs of the insulating member. The separator 7 is next placed between the plates 5 and $5^a$. The jar 1 is then filled with electrolyte which is hot and consequently is in fluid condition, and the cell cover is placed in position on the rim of the jar with the plates and separators inside the jar. The cell is then ready to be charged.

When a battery is to be made up of more than one cell, the cells are placed side by side as shown in Fig. 1, from which view it will be seen that the end of the positive lug or terminal post of cell A is almost in contact with the end of the negative lug or terminal post of cell A'. These two terminal posts are then burned together, or electrically connected in any other suitable manner, so that the two posts form a continuous electrical conductor as shown in Fig. 4. The several cells are then placed in a suitable frame or box which may be of wood coated with an acid-proof paint.

Referring again to Fig. 2, it will be seen that the cell cover is provided with a vent hole $2^c$, one purpose of which is to permit the addition of water to the cell to replace that which is lost by evaporation.

This hole is ordinarily closed by a plug 8, as shown in Fig. 5, and to hold this plug in place I preferably provide the cell cover with a lug $2^a$ which may be bent over the plug as shown in Fig. 5. This lug can be bent out of the way of the plug to permit removal of the plug when the water in the cell is to be replenished or the cell is to be charged.

Although I have herein shown and described only one form of battery embodying my invention, it is understood that various changes and modifications may be made therein within the scope of the appended claims without departing from the spirit and scope of my invention.

Having thus described my invention, what I claim is:

1. A storage battery comprising a jar, a metallic cell cover thereon provided with two holes, an insulating member comprising two hollow legs passing through said two holes respectively, and two plates in said jar provided with lugs passing upwardly through said two hollow legs to form terminal posts for the battery.

2. A storage battery comprising a jar having a cover provided with two holes, a member of insulating material having two hollow legs passing through said two holes respectively, and two plates in said jar provided with lugs passing upwardly through said hollow legs to form terminal posts for the battery.

In testimony whereof I affix my signature.

PAUL E. NORRIS.